(12) United States Patent
Jorke

(10) Patent No.: US 6,283,597 B1
(45) Date of Patent: Sep. 4, 2001

(54) METHOD AND FACILITY FOR LIGHT-BEAM PROJECTION OF IMAGES ON A SCREEN

(75) Inventor: Helmut Jorke, Gerstetten (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/194,845

(22) PCT Filed: Apr. 28, 1998

(86) PCT No.: PCT/EP98/02504
§ 371 Date: Dec. 4, 1998
§ 102(e) Date: Dec. 4, 1998

(87) PCT Pub. No.: WO98/49837
PCT Pub. Date: Nov. 5, 1998

(30) Foreign Application Priority Data

Apr. 30, 1997 (DE) ................................. 197 18 301
Feb. 27, 1998 (DE) ................................. 198 08 264

(51) Int. Cl.[7] .................................................. G03B 21/00
(52) U.S. Cl. ................... 353/31; 353/34; 349/15; 348/766
(58) Field of Search ................... 353/31; 349/15, 349/104, 23, 5, 57, 286, 465; 348/58, 766, 769, 57, 42; 359/462, 466, 590, 359, 360, 580, 589, 464, 722, 887

(56) References Cited

U.S. PATENT DOCUMENTS 4,158,133 * 6/1979 Spaeth et al. .................... 250/211
4,623,219 11/1986 Trias .
4,641,178 2/1987 Street .
5,537,476 7/1996 Coteus et al. .
5,808,222 9/1998 Rasch et al. .

FOREIGN PATENT DOCUMENTS 0 473 343   3/1992  (DE) .
195 03 929
       A1   7/1995  (DE) .
1-116521    5/1989  (JP) .

* cited by examiner

Primary Examiner—Safet Metjahic
Assistant Examiner—Etienne LeRoux
(74) Attorney, Agent, or Firm—Reed Smith LLP

(57) ABSTRACT

In a process for the projection of images on a screen (20) by means of a light bundle, an individual projector (40) is provided for projecting the images, wherein the light bundle used for projection is emitted from a light source (12, 12') in the projector (40) whose light has at least one spectral peak in the visible wavelength range with a half-width of less than 100 nm, especially less than 30 nm, and observers of the image are given eyeglasses (24, 24') which have a wavelength-dependent transmission function such that light in the wavelength range of at least one spectral peak or, if more than one spectral peak, in the wavelength range of at least one of these spectral peaks passes through each eyeglass (24, 24'), and the light intensity for light with wavelengths beyond this spectral peak or spectral peaks is reduced.

15 Claims, 9 Drawing Sheets

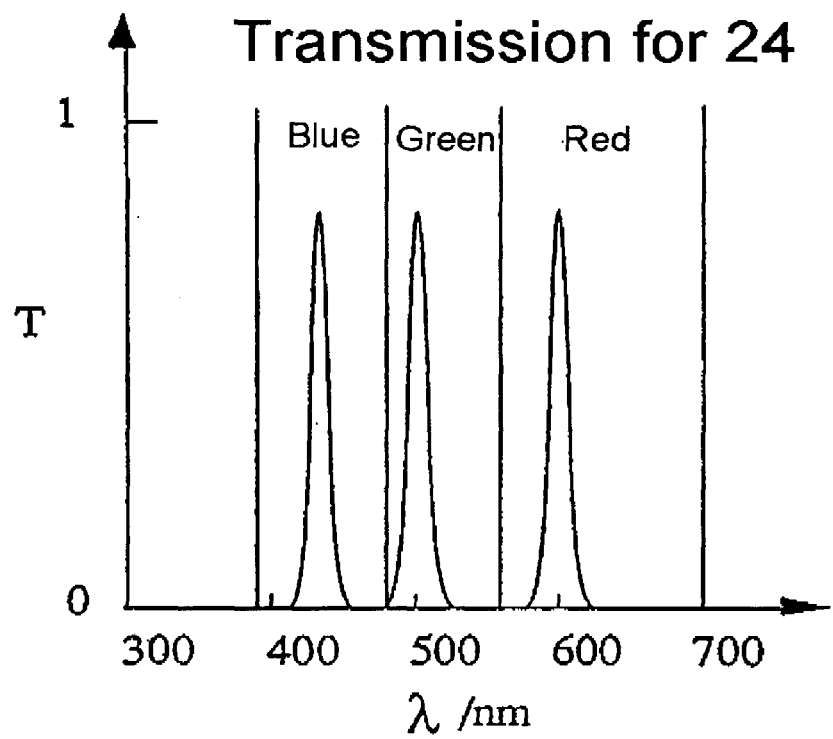
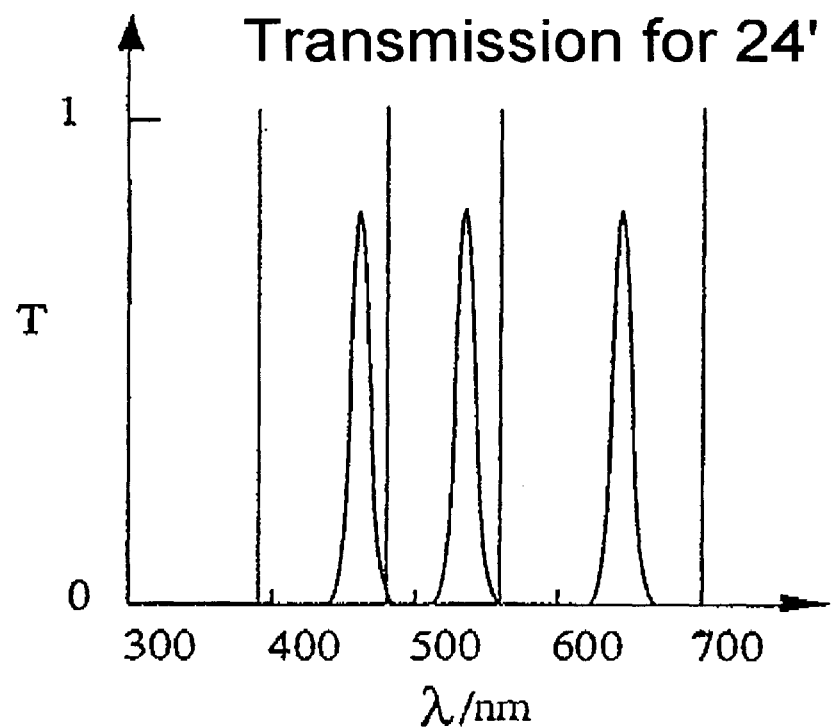
Fig.3

METHOD AND FACILITY FOR LIGHT-BEAM PROJECTION OF IMAGES ON A SCREEN

BACKGROUND OF THE INVENTION a) Field of the Invention

The invention is directed to a process for the projection of images on a screen by means of a light bundle. The invention is further directed to a system with an individual projector for the display of an image on a screen by means of a light bundle, wherein the system can be used especially for carrying out the process according to the invention.

b) Description of the Related Art

Image projections have already been known for a very long time. Most notable in this respect is the Latema Magica from 1569 which is often referred to as the forerunner of modem slide projectors and episcopes. Film projectors, video projectors and head-up projectors should also be mentioned in this context.

With respect to video projectors, there are at present also other projectors, aside from eidophors and picture tube projectors, which project a video image on a screen in the manner of a slide or transparency, wherein the video image is electrically adjusted on an LCD matrix. Further, projectors are currently being developed in which a light bundle is directed onto a tilting mirror array, wherein the tilting mirror array generates the image content by rapidly switching individual tilting mirrors on and off based on locally different reflections of a light bundle which is then projected through an objective onto a screen. Modern developments, e.g., according to DE 43 42 849 C2, are also directed to the display of video pictures on a screen in that a laser beam is raster-scanned on a screen similar to an electron beam in an electron beam tube. The laser beam is color-modulated and intensity-modulated for the respective image points illuminated during scanning and a video image is made visible for an observer due to the rapid scanning and the inertia of the observer's eye.

Processes for the projection of images with these projection techniques are currently used in many commercial areas. The cinema is the best known example. Further, the proceedings at spectator events, political conventions and the like large-scale events are frequently made more visible for spectators at a distance by imaging speakers or artists by means of large-format video projection.

Further, projection methods of the type mentioned above are also used in advertising, particularly at trade fairs.

However, projection of the above-mentioned type creates problems especially in daylight. The light intensity is usually not sufficient in relation to sunlight, which can also strike the screen, for delivering adequately high contrast in order to view clear, high-quality images. Usually, no image at all can be detected when bright sunlight falls on the screen. However, it would be extremely desirable to be able to use the projection techniques mentioned above also in large open-air events, outdoor concerts, ball games or the like, so that spectators at a great distance from the proceedings, for example, at a ball game, can also clearly discern details on a large screen so as to make attendance at the event more appealing to these spectators and dissuade them from the alternative of viewing the televised event.

OBJECT AND SUMMARY OF THE INVENTION

It is the primary object of the invention to increase the contrast of the image projection relative to ambient light, especially sunlight, in projections of images on a screen.

Proceeding from the prior art mentioned in the introduction, this object is met by a process in which an individual projector is provided for projecting images, wherein the light bundle used for projection is emitted from a light source in the projector whose light has at least one spectral peak in the visible wavelength range with a half-width of less than 100 nm, especially less than 30 nm, and in which the observer of the image is given eyeglasses which have a wavelength-dependent transmission function such that light in the wavelength range of at least one spectral peak or, if more than one spectral peak, in the wavelength range of at least one of these spectral peaks is transmitted by each eyeglass, and the light intensity for light with wavelengths beyond this spectral peak or spectral peaks is reduced.

A system of the type mentioned above for carrying out the process is characterized according to the invention by a light source in the projector which emits the light bundle and whose light has at least one spectral peak in the visible wavelength range with a half-width of less than 100 nm, especially less than 30 nm, and by at least one eyeglass for which a wavelength-dependent transmission function is provided such that exclusively light in the wavelength range of at least one spectral peak or, if more than one spectral peak, in the wavelength range of at least one of these spectral peaks is transmitted by the eyeglass, and the light intensity for light with wavelengths beyond this spectral peak or spectral peaks is reduced.

Accordingly, the projection is carried out with light which is emitted in a very narrow band in narrow wavelength ranges, namely, within the spectral peak. Only light generated within a wavelength range of this spectral peak is detected by the eyeglass, so that an observer seeing through this eyeglass can detect the image information in its entirety just as the observer would without the eyeglass. However, the ambient light, for example, sunlight, is attenuated overall by filtering out large wavelength regions.

In a graph in which the light intensity is plotted over wavelength, spectral peak in the present sense means a peak, a Gaussian-like distribution, a rectangular function or any curve whose half-width is appreciably less than the width of the brightness sensitivity curve or photopic response curve of the human eye, for example, in accordance with DIN 5031, which is approximately 100 nm. It is important in this respect that only a narrow wavelength range is available for the light generation and the transmission through the eyeglass because of the function shape in the intensity/wavelength graph.

The indicated haff-width of 100 nm or 30 nm of the spectral peaks has turned out to be especially advantageous as an upper limit because this also allows a proper separation of projection light and ambient light even when color display is desired. In this respect, it should be noted in particular that white light requires a mixture of at least three primary colors, so that light for displaying black-and-white images should have at least three spectral peaks. However, the invention is not limited to this. In some applications in which large-scale projection requires text in a single color, for example, in advertising events, a monochrome display with a single spectral peak would be entirely adequate. However, an upper limit of 100 nm or 30 nm half-width is also recommended in this case so that a sufficiently high contrast can still be provided relative to the ambient sunlight by taking into account the logarithmic response of the human eye.

Similar considerations also apply in laser shows, wherein the invention is also directed to these. However, in this case, the concept of the screen is understood in a very broad sense; namely, it also includes fog or the like generated by a fog machine or also a wall of water.

The eyeglasses can be installed in spectacles, for example. However, it is also possible to hand out suitable disks or sheets to the observer as eyeglasses which can then be held in front of the observer's field of view in harsh sunlight.

Unexpectedly, the object of the invention can be met through commonplace steps such as increasing the light output or other more elaborate alternatives such as a special technical design of the screen. However, the solution according to the invention is very simple. In principle, it is only necessary to separate suitable light from the light source in a spectrometric manner as in a monochromator or to replace the light source of known projectors with suitable monochromatic light sources, for example, lasers. The manufacture of usable eyeglasses also presents no substantial problems in technical respects. For this purpose, in particular, almost any desired transmission behavior can be adjusted by means of vacuum-deposition of dielectric coatings on a glass substrate or sheets. This technique is known, for example, from the coating of lenses and mirrors.

In mass production, a vacuum-deposition of dielectric layers can also be carried out in a sufficiently economical manner in order that every visitor to a large-scale event in which the projection according to the invention is used can be outfitted with an appropriate eyeglass without the need for a substantial increase in the price of admission for such event.

According to an advantageous further development of the invention, the eyeglass is arranged in spectacles which are adapted to the heads of the observers and provided with a shield against light which prevents light from falling between the eyeglass and the eye of the observer.

This means that these spectacles have a shield such as that known from welding glasses, for example. However, in welding glasses, the lateral covering serves chiefly to block sparks and chips. In the case of the projection according to the invention, however, this lateral shielding serves to shield against lateral light in order to further increase the contrast of the light originating from the image relative to ambient light.

The spectacles also need not necessarily be constructed as two-glass spectacles. One-glass spectacles are also possible, e.g., in a design known, for example, from diving goggles which have an individual viewing window and which are attached to the head by an elastic band and completely shield against ambient light by resting snugly against the head.

It will also be appreciated from this last example concerning diving goggles that spectacle sides or temples such as those used in conventionally shaped spectacles are not necessarily required. For example, it is also possible to hold the spectacles on the observer's head by means of an elastic band looped around the head of the observer or by means of two band parts which are attached to the spectacles and can be knotted together.

As was already made clear in the preceding, it is particularly advantageous for black-and-white or color images when, in accordance with an advantageous further development of the invention, the light bundle has at least three spectral peaks which are selectively passed by the eyeglass with respect to its wavelength range. For example, white can be displayed with a light bundle of the above-mentioned type as can a great many colors, given a suitable selection of the position and the intensities of the spectral peak and, for example, in the case of transillumination of a transparency.

According to a preferred further development of the invention, light with a spectral peak of suitable intensity and centroid wavelengths is emitted by the light source so that it can be made physiologically detectable as white through the eyeglass. The intensities and centroid wavelengths suitable for this purpose can be taken from chromaticity triangles known from printing and television technique. Particularly in the case of very narrow spectral peaks which are especially conducive to the suppression of ambient light, the hues in the CIE chart then lie on or in the vicinity of the spectral plotted curve.

When using a light source of the type mentioned above for illumination of a transparency, colored images can also be displayed in addition to normal black-and-white images, wherein the transparency changes the intensity of the light of the spectral peaks from the light source in different ways locally through absorption depending on the color.

For other arrangements, for example, for the laser projection technique which was already mentioned, an advantageous further development of the invention is characterized in that a control device is provided for the display of a video image, by which the intensities of the spectral peaks in the light bundle are controllable independent from one another, and in that the light source is configured for positions of the spectral peak in the wavelength spectrum in which a light bundle whose light is physiologically detectable as white can be generated by this control. In this further development, in addition to application in video projection, the color of the light bundle can also be advantageously adjusted by means of the control device in such a way that color corrections can also be carried out, for example, for transparency projection, by means of color adjustment of the projecting light bundle, so that an image which is as true to nature as possible can be displayed.

Particularly narrow spectral peaks result when laser light is used. The spectral band of lasers is usually very narrow and, therefore, when used according to the invention, lasers allow a very high contrast with, at the same time, a suitable narrow transmission function of the eyeglasses. This is utilized in an advantageous manner in a further development of the invention in which the light source has at least three lasers for generating partial light bundles of different colors and has an optical system which combines the light of the partial light bundles to form the common light bundle of the light source.

Another advantageous further development of the invention even enables stereoscopic viewing in that two eyeglasses are arranged in spectacles, wherein the spectral transmission functions of the eyeglasses have different transmission ranges, and in that the light bundle exiting from the projector has a spectrum which covers the transmission ranges of both eyeglasses, so that different image information for stereoscopic image display can be allocated to the two eyeglasses.

The distances of the spectral peaks between the left eyeglass and the right eyeglass can be as much as 50 nm.

Accordingly, due to the different transmission functions for the left eye and right eye in spectacles, information can be transmitted for both eyes by one and the same light bundle. Something of this kind is already known from Patents Abstract of Japan P-915, Aug. 10, 1989, Volume 13/No. 357. However, in that case, six projectors must be used, that is, three for each eye. The invention makes it possible to use an individual projector for stereo projection, which advantageously reduces the high cost for six projectors. An increase in contrast is not addressed, nor is it possible, in the above reference because the light output is sharply reduced by the color separation.

This expenditure for a plurality of projectors is reduced especially in laser projection with a scanned light bundle because in this case, according to the further development, the same objective as well as the same scanning devices can be used for the two different images which are determined stereoscopically for both eyes.

In another advantageous further development of the invention, the light bundle has a diameter suitable for imaging individual image points of the video image and a deflection device is provided which deflects the entire light bundle which is acted upon spectrally by the information for both eyes.

As can already be gathered from the many different further developments indicated in the preceding, the invention can be arranged in different ways for many special applications. For the sake of completeness, further possibilities are indicated especially for stereo projection. In this connection, the images received by the eye based on the different spectral information are referred to hereinafter as half-images in order to facilitate the description, even though the person skilled in the art understands the expression "half-images" somewhat differently in television technique.

With respect to the stereo projection process which is also possible according to the invention, every device projecting a half-image emits light with spectral peaks of at least three different wavelengths, specifically with a line width of less than 30 nm, preferably less than 5 nm, wherein the spectral peaks of every device projecting half-images lie in spectral ranges for dominant excitation of the blue receptors, the green receptors and the red receptors in the human eye. In this respect, the spectral peaks of the projecting devices for the half-images of the right eye and left eye do not overlap. Thus, an observer observes the projected half-images with spectacles whose glasses are constructed as dielectric interference filters and whose transmission maxima lie in the spectral peaks of the corresponding devices projecting half-images.

In particular, it is possible to adapt color perception through the spectacles, for example, in that the spectral peak of greater wavelength responsible for the excitation of the blue receptors is weakened relative to the spectral peak of shorter wavelength in accordance with the photopic response curve of the human eye, or the spectral peak of shorter wavelength responsible for the excitation of the red receptors is weakened relative to the spectral peak of greater wavelength in accordance with the photopic response curve of the human eye. In particular, Fabry-Perot filters can also be used as interference filters in an advantageous manner.

Particularly for dome projections in which a very large solid angle area must be comprehended by the eye of the observer, it is further advantageous when dielectric interference filters serving as eyeglasses are curved and positioned in such away that each forms a concentric semispherical shell around the respective eyeball.

When using monochromatic light sources, it is advantageous for the purpose of combining the individual light bundles of the monochromatic light sources to form a common light bundle in a simplified manner when their light is combined by means of dispersion prisms. In another embodiment form, for example, when no monochromatic light sources such as lasers are used, it is particularly advantageous when radiators, for example, a combination of superluminescent diodes of different colors, are used as light sources in the devices projecting half-images, wherein the spectra of the radiators are filtered into narrow line spectra by dielectric interference filters. In this respect, it is especially advantageous to use Fabry-Perot filters as dielectric interference filters in order to provide the smallest possible bandwidth. Particularly favorable narrow-band spectral peaks are achieved in an economical manner when interference orders of 5, 6 and 7 are preferably used for filtering.

These light sources and the filtering by Fabry-Perot filters are also possible especially for electronically generated video images, for example, with the tilting mirror technique mentioned in the introduction, wherein electronically generated video images are used as image models for the device projecting half-images. In this case, also, the light can already be filtered in accordance with the spectral peaks before it is directed to the tilting mirror array mentioned by way of example. On the other hand, in another advantageous further development, the emission spectrum, that is, the reflected light in the case of the tilting mirror array used as example, is filtered by dielectric interference filters to form line spectra. In this case, also, Fabry-Perot filters can preferably be used as dielectric interference filters, especially utilizing interference orders 5, 6 and 7.

However, when using a stereoscopic projection process with lasers, filtering is generally not required for achieving narrow spectral peaks, since lasers are already adapted to essentially one wavelength due to their construction, wherein the spectrum then has a very narrow band. For this purpose, it is especially advantageous when the laser light bundles modulated with the half-images are simplified by means of a dichroic mirror with a three-fold bandpass characteristic. This is particularly advantageous for distortion-free imaging of the half-images.

Of course, dispersion prisms can also be used for unifying the light bundles generated by the lasers, also with distortion-free imaging of the half-images. However, the use of a dispersion prism is substantially more economical than, for example, a dichroic mirror system whose use is presently preferred in scanning laser projection technology.

A particularly favorable advertising effect can also be achieved with these stereoscopic projections in that identical half-images are projected for both eyes, wherein, however, the projections of the half-images are offset horizontally. This results in a virtually two-dimensional image which appears to lie outside of the projection surface, in this case the projection screen.

In the following, the invention will be described more fully with reference to embodiment examples in connection with the accompanying drawing.

BRIEF DESCRIPTION OF THE DRAWINGS IN THE DRAWINGS

FIG. 3 shows the transmission curves for the eyeglasses shown in the embodiment example of FIG. 1;

DESCRIPTION OF THE PREFERRED EMBODIMENTS

Exclusively stereo projection systems are described in the following. However, as was already mentioned above, the invention is not limited thereto. The great advantage, according to the invention, over conventional techniques based on increased contrast relative to daylight is also provided when eyeglasses having the same transmission function are provided for both eyes of an observer or when only one individual eyeglass is provided.

Figure 1:
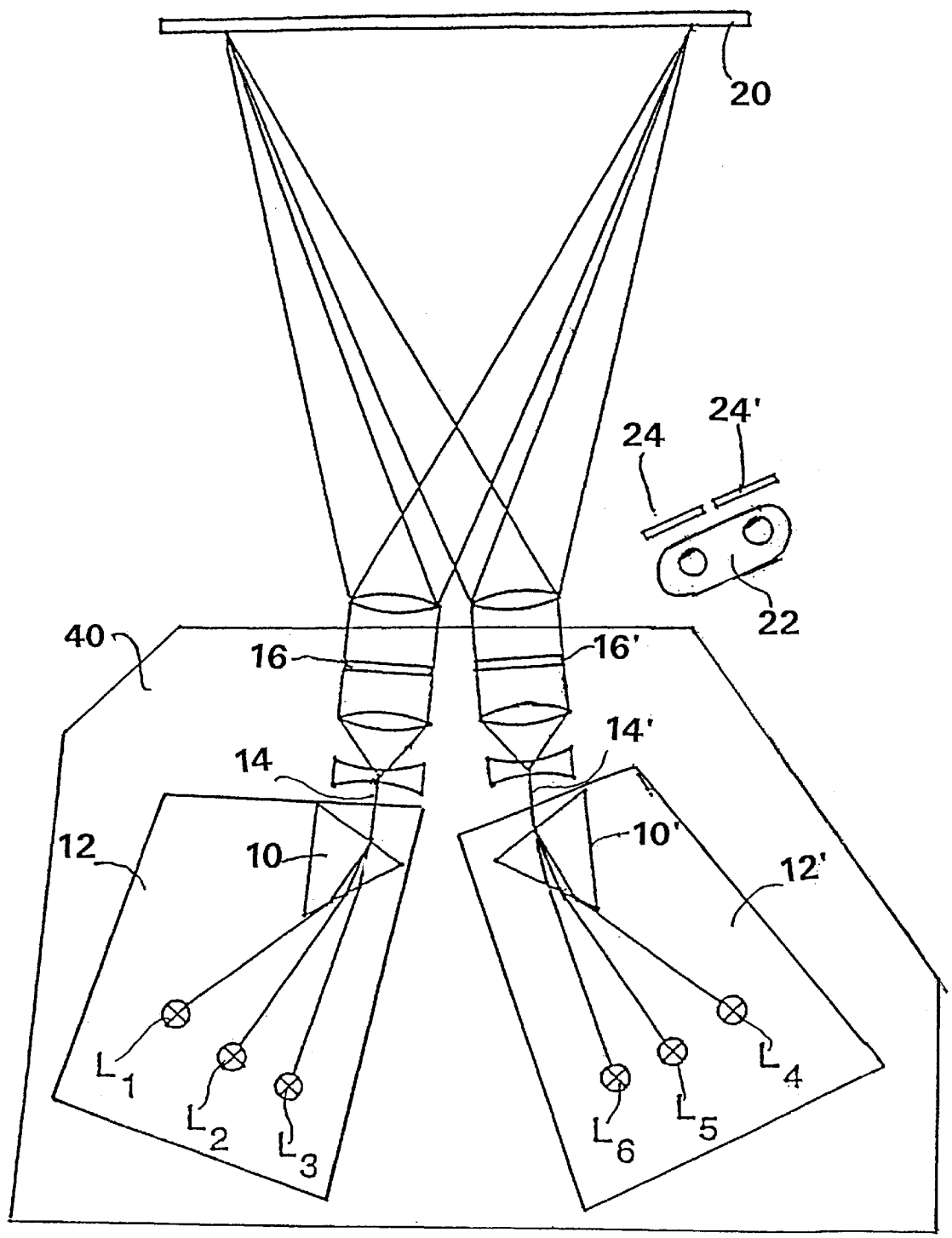
FIG. 1 shows a video projection system with an individual projector whose light has six spectral peaks.
Figure 2:
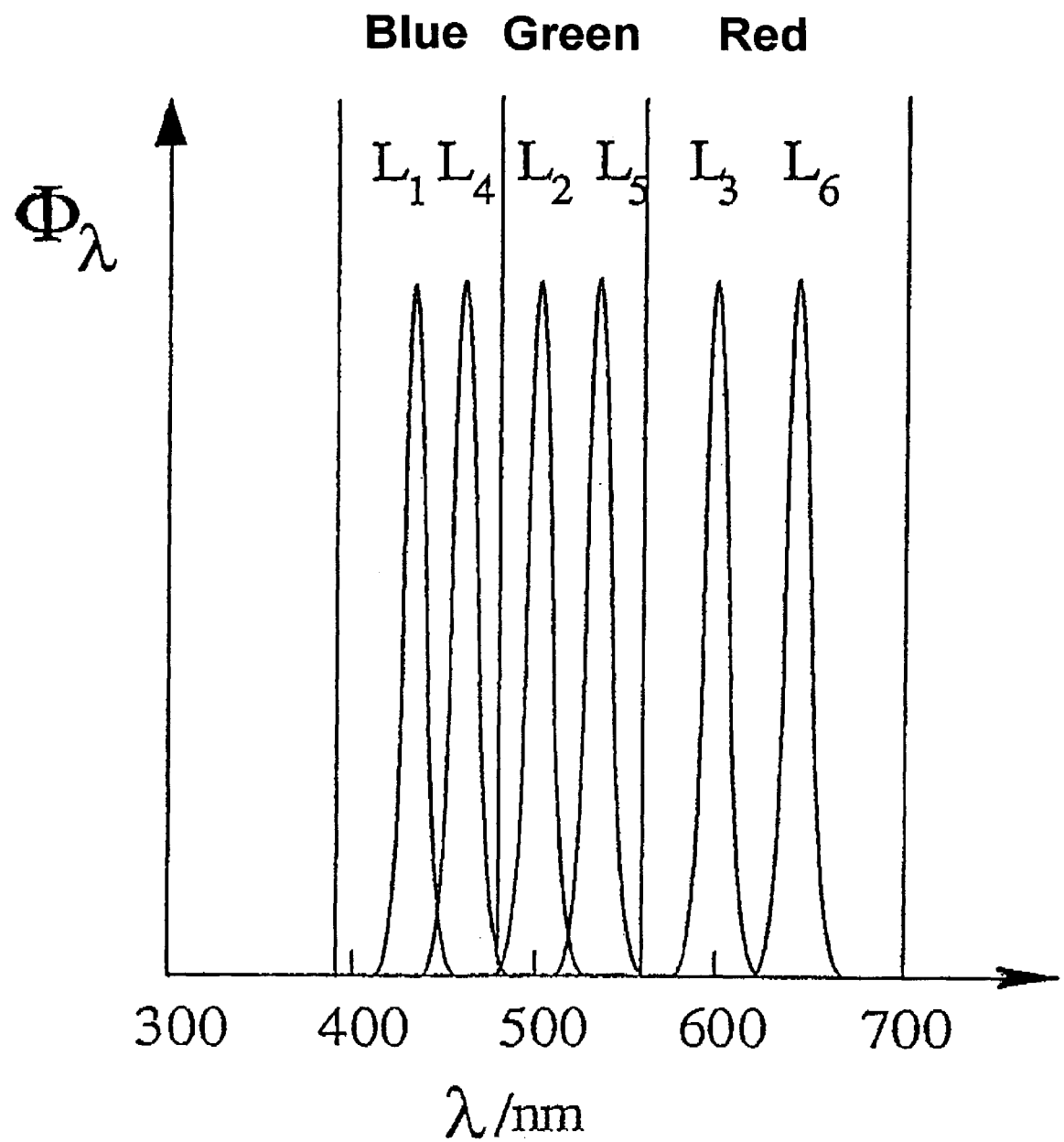
FIG. 2 shows an intensity-wavelength graph for the light bundle used in FIG. 1 for displaying the spectral peaks used in this case.

FIG. 1 shows a stereo projection system with six essentially monochromatic light sources $L_1$ to $L_6$, whose spectra are represented in FIG. 2. The spectral peaks of $L_1$ (430 nm) and $L_4$ (460 nm) lie in the range of dominant excitation for the blue receptors in the human eye, at approximately 380 to 490 nm. The spectral peaks of $L_2$ (502 nm) and $L_5$ (537 nm) lie in the range of dominant excitation for the green receptors, i.e., at approximately 490 to 555 nm. The spectral peaks of $L_3$ (602 nm) and $L_4$ (644 nm) lie in the range for dominant excitation of the red receptors, that is, at approximately 555 to 700 nm.

The light emitted by $L_1$, $L_2$ and $L_3$ is unified in a dispersion prism 10. In the same way, a dispersion prism 10' serves to unify the light bundles from $L_4$, $L_5$ and $L_6$. The dispersion prism 10 or 10' with light sources $L_1$, $L_2$, $L_3$ or $L_4$, $L_5$, $L_6$ forms an individual light source 12 or 12' from which an individual light bundle 14 or 14' exits.

The light bundles 14 and 14' are expanded by lens systems and subsequently travel through transparencies 16 and 16' by which the information for the left eye and right eye of an observer 22 is impressed on the light bundles 14 and 14'. These light bundles subsequently fall on a screen 20 which can be a projection screen for incident projection or a screen for rear projection or, within the broadest meaning, can also be fog generated by a fog machine or a water wall.

The imaging is carried out by means of conventional objectives such as those known from conventional slide projectors which are indicated schematically in FIG. 1 by individual lenses.

The image separation at the location where the observer 22 is situated is carried out by Fabry-Perot filters 24 and 24'. Fabry-Perot filters have a high degree of separation for individual spectral peaks and are especially suitable for high contrast relative to ambient light. The position of the transmission maxima of a Fabry-Perot filter is given by the following equation:

$$\lambda_m = \frac{2d}{m},$$

where d is the optical thickness of the dielectric material of the filter and m is the order of interference of the filtered light. Assuming the absence of dispersion in the dielectric material, which assumption is incorporated in the equation for the sake of simplicity, it is only necessary to consider a constant wavelength-independent optical thickness d. When d=1,505 nm for the Fabry-Perot filter 24, the following transmission maxima are given for orders m=5, 6, 7 for the following wavelengths:

$\lambda_5$=430 nm $\lambda_6$=502 nm $\lambda_7$=602 nm, which are also generated by the spectral peaks of the light sources $L_1$, $L_2$ and $L_3$. The wavelengths of the following transmission maxima are calculated in a similar manner when d=1,610 nm with respect to the Fabry-Perot filter 24':

$\lambda_5$=460 nm $\lambda_6$=537 nm $\lambda_7$=644 nm, which wavelengths are adapted to the light bundles of light sources $L_4$ to $L_6$.

The position of the individual spectral peaks of the light sources $L_1$ to $L_6$ is shown again in particular in FIG. 2 and the corresponding transmission curves for the Fabry-Perot filters 24 and 24' are shown in FIG. 3.

As can be seen from a comparison of FIG. 2 and FIG. 3, the left eye according to the embodiment example in FIG. 1 detects only the image content of transparency 16, whereas only the image content of transparency 16' is conveyed to the right eye of the observer 22.

As was already stated above, these examples relate to stereo projection. However, it is particularly important in this respect that ambient light such as sunlight is attenuated due to the narrow transmission curves shown in FIG. 3. This characteristic is the reason why a greater contrast is achieved in the eye of the observer relative to ambient light in daylight projection.

This advantageous characteristic is also provided in the following embodiment examples, although no further reference is made to it.

Figure 4:
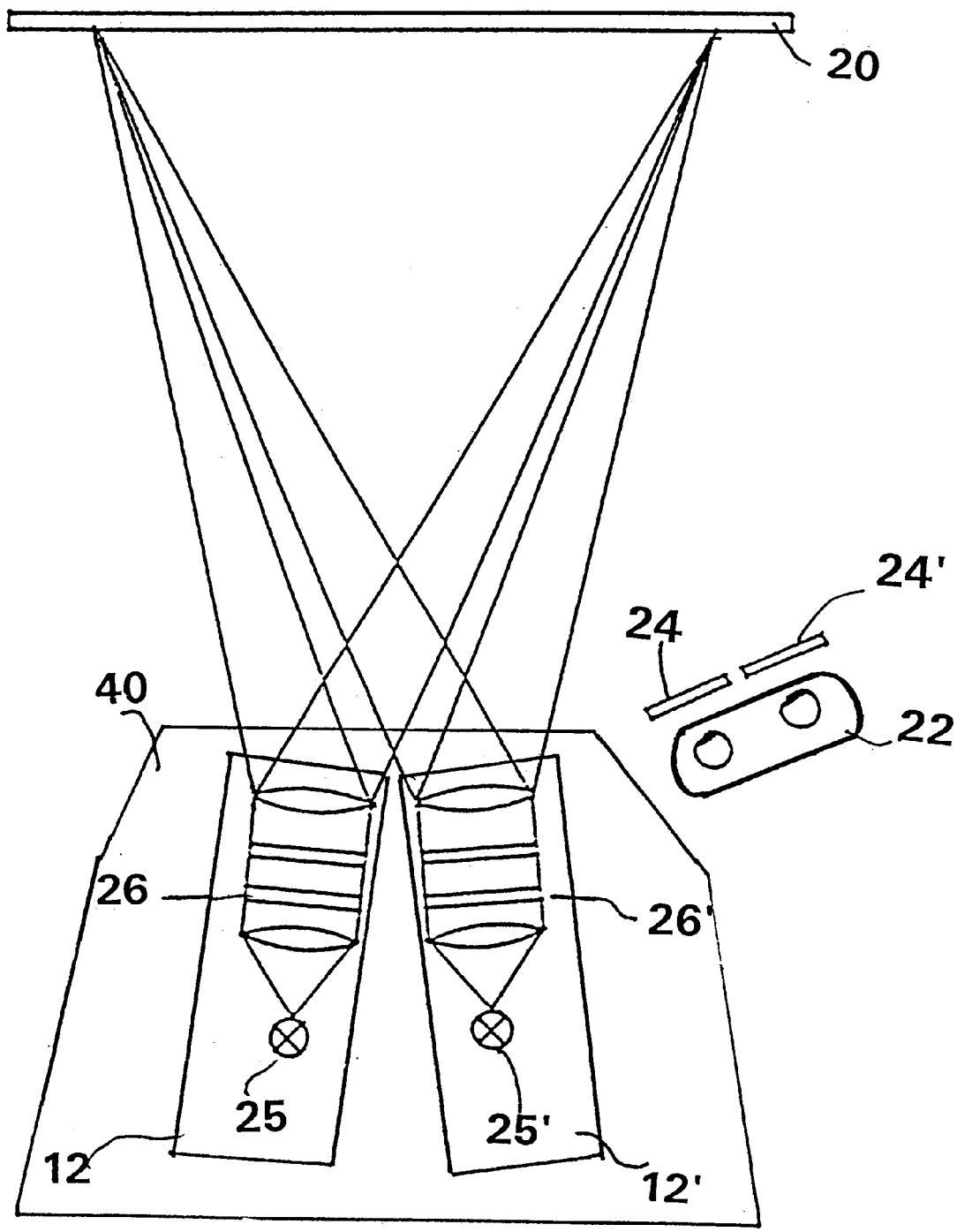
FIG. 4 shows an embodiment example in which the spectral peaks are generated by Fabry-Perot filters.

Another embodiment example is shown schematically in FIG. 4. The light from radiators 25 and 25' which can be constructed, for example, as a combination of different colored superluminescent diodes is filtered by other Fabry-Perot filters 26 and 26', resulting in the spectra that were already indicated in FIG. 2 and that are adapted to the transmission curves according to FIG. 3. In particular, the Fabry-Perot filters 26 and 26' can also be arranged in the same way as the Fabry-Perot filters 24 and 24' on the eyeglasses for the observer 22.

LCD matrices could also be used instead of transparencies, so that it is also possible by means of this technique to carry out video projection by means of controlling the LCD matrix with the video image. For color display, different colors must be allocated to the individual image elements of the LCD matrix in the form of a raster pattern of corresponding color filters so as not to be restricted to black-and-white images.

Figure 5:
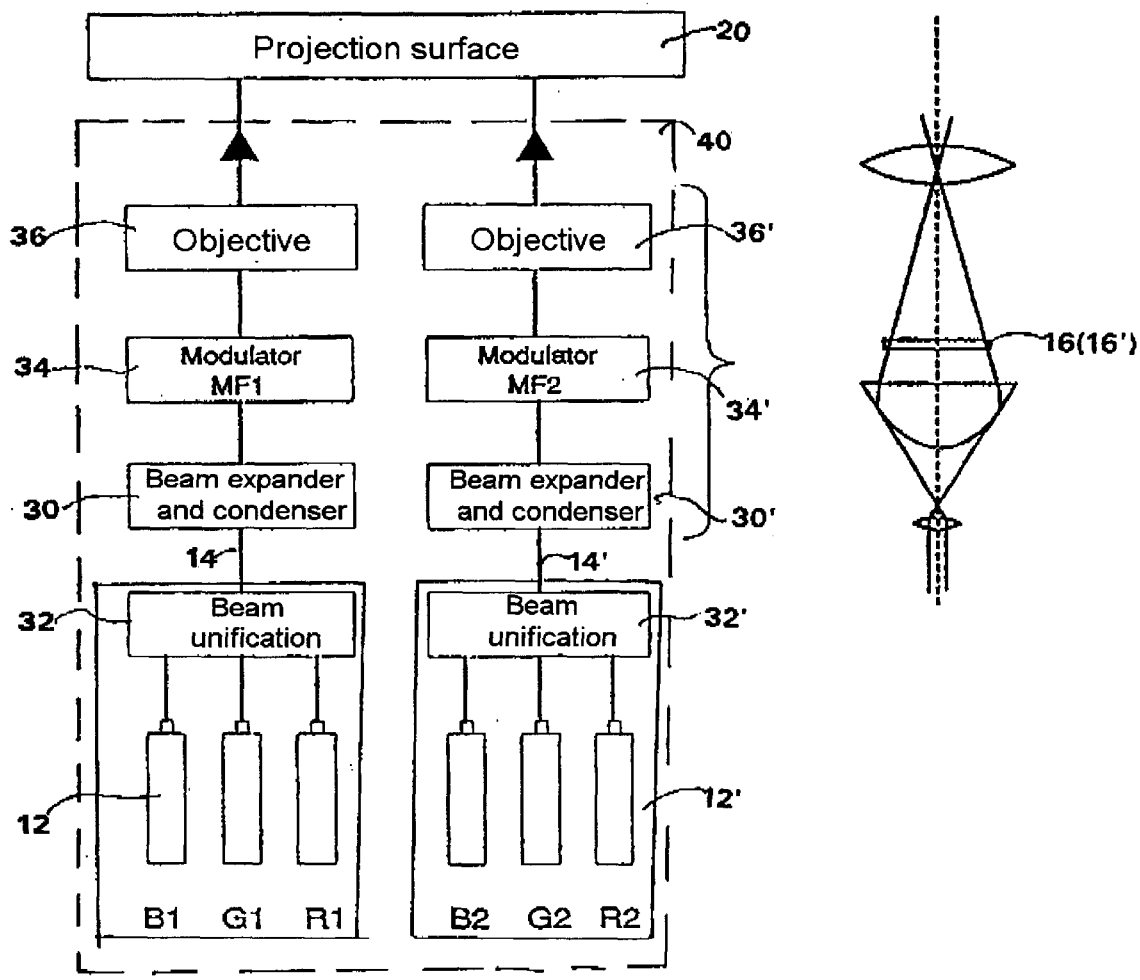
FIG. 5 shows an embodiment example with lasers as light sources.
Figure 6:
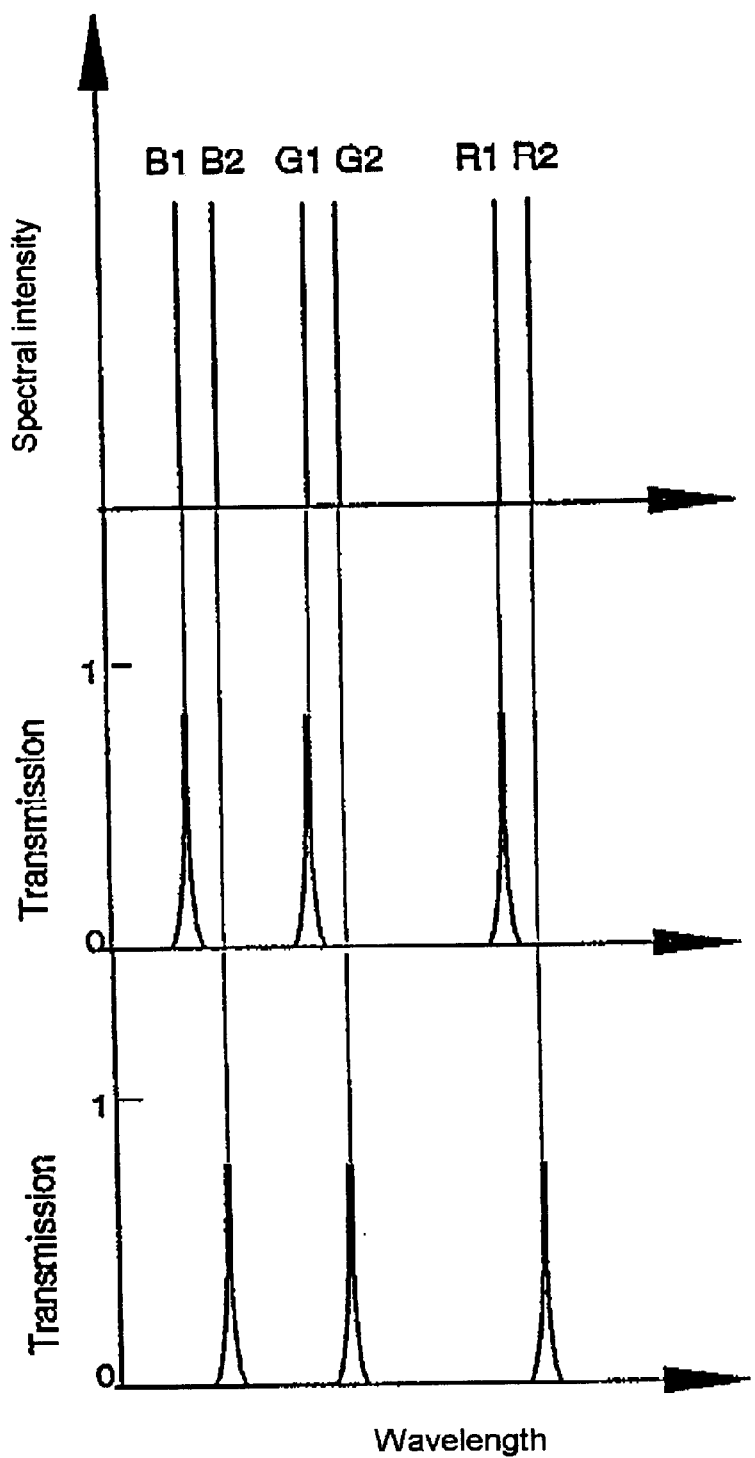
FIG. 6 shows several graphs for illustrating the spectral intensity and the transmissions for the eyeglasses for the right eye and left eye in the embodiment example of FIG. 5.

FIG. 5 shows, by way of example, a stereo projection system comprising two devices projecting half-images with lasers $B_1$, $G_1$, $R_1$, $B_2$, $G_2$, $R_2$ whose spectra are given in the graph of FIG. 6 labeled "spectral intensity". The wavelengths of $B_1$ and $B_2$ lie in the range for dominant excitation of the blue receptors in the human eye. The wavelengths of $G_1$ and $G_2$ lie in the range for dominant excitation of the green receptors. Further, the lasers $R_1$ and $R_2$ which are considered as spectral peaks lie in a wave range in which a dominant excitation of the red receptors takes place. The light emitted by $B_1$, $G_1$ and $R_1$ is unified by dichroic mirrors or by a dispersion prism to form an individual light bundle 14. The light bundle 14 is unified in the same way from the individual beams of lasers $B_2$, $G_2$ and $R_2$.

The combination of the respective three lasers with the beam unifying device 32 and 32' which is indicated as a box and is constructed in this instance, by way of example, as a dispersion prism, again forms individual light sources 12, 12' with the corresponding output light bundles 14 and 14'. The light bundles are expanded in a manner suitable for uniform illumination by a combination of beam expander and condenser 30 and 30' as was already made clear with reference to FIG. 1. The light bundles then travel through spatial modulators 34 and 34'. These spatial modulators modulate the light traveling through them in a planar manner. This technique is known, for example, from transparency projection or projection through an LCD matrix. Different locations on a transparency or on an LCD matrix acted upon by a video image absorb different components of light when the light bundles 14 and 14' pass through and thus modulate the light spatially or locally.

The light modulated in this way subsequently passes through objectives 36 and 36' by which it is projected onto the projection surface 20 for reflection to the eye of the observer. The combination of beam expander and condenser 30 and 30', spatial modulator 34 and 34' and objectives 36, 36' is illustrated again next to the schematic drawing described above in order to afford further instruction enabling the person skilled in the art to construct the invention in a suitable manner.

As in the preceding embodiment examples, both systems for projection for the left eye and right eye are accommodated in an individual projector 40, a characteristic not known from the prior art in which an individual projector was used for projection for each eye, the right and the left. The advantage resulting from the combination of two individual projectors in a common projector 40 consists above all in that stereo images are projected on a screen in a manner which can always be reproduced, whereas in separate projectors the positions of the individual projectors always had to be balanced prior to the presentation so that the image is always detected as a stereo image and so that the observers eyes do not see images of different sizes, which is not a natural occurrence and therefore irritates the observer's brain and would lead to headaches in conjunction with uneasiness and nausea, which would not be suitable for long presentations.

FIG. 6 also shows spectral graphs for the intensity and the transmission of the eyeglasses for the left and right eye. In particular, the two lower graphs for transmission show a characteristic which can be achieved, for example, with metal-dielectric interference filters with a slight difference in cavity spacing. According to FIG. 6, the wavelengths of the lasers coincide with the transmission maxima, so that the projected half-images can be perceived separately by means of the eyeglasses on which these filters are provided as vacuum evaporation coatings. As a result of the high degree of separation of metal-dielectric interference filters, the corresponding wavelengths can be selected close together for the laser systems associated with the two half-images. Given sufficient closeness, an identical color receptor excitation even takes place in the left eye and right eye of an observer, so that it is even possible to reproduce the two half-images with almost identical colors. In particular, large spectral components of daylight lying outside of the narrow transmission ranges of the interference filters are filtered out, so that a troublesome reduction in image contrast is prevented even when projecting in daylight.

Figure 7:
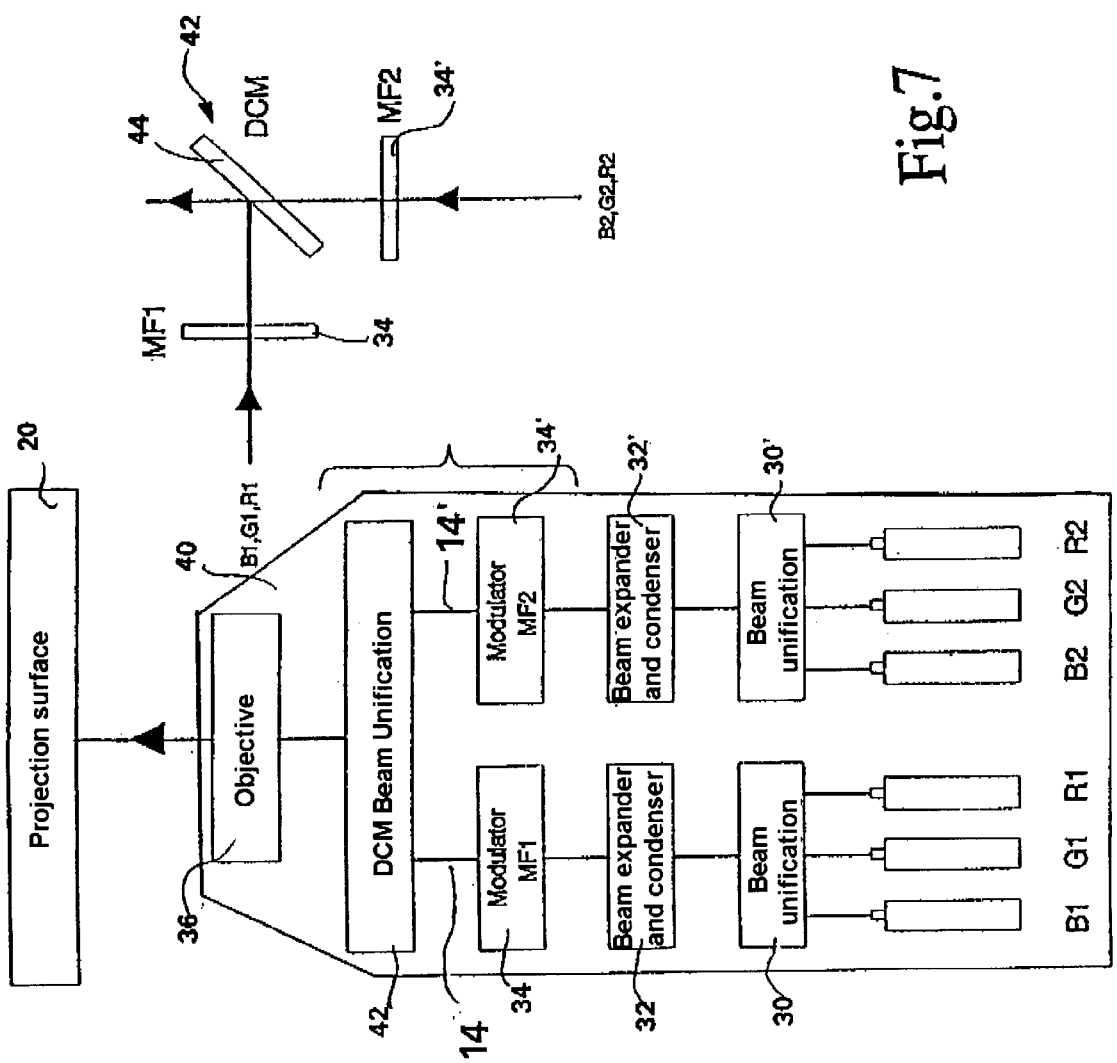
FIG. 7 shows another embodiment example for laser projection.

A further embodiment example is shown schematically in FIG. 7. This differs from the embodiment example of FIG. 5 in that the light bundles 14, 14' from the modulators 34 and 34' are unified by means of another beam combiner 42 before they fall on the shared objective 36 from which they are then projected jointly onto the projection surface 20 and dispersed to the eyeglasses of the observer.

The beam combiner 42 in this case comprises a dichroic mirror 44 as is indicated at the side in an individual schematic view with modulators 34 and 34'. The dichroic mirror 44 used in the embodiment example has a multiple bandpass characteristic, wherein the leading edges of the dichroic characteristic values of this mirror, with respect to the wavelengths of the lasers, lay between $B_1$ and $B_2$, between $G_1$ and $G_2$, and between $R_1$ and $R_2$. The trailing edges of the dichroic characteristic of the transmission curves lay between $B_2$ and $G_1$ and between $G_2$ and $R_1$.

In addition to the dichroic mirror 44 shown by way of example, other beam guiding systems can also be realized, for example, by a layering of glasses having different refractive indexes, wherein the reflected beam is then reflected by total reflection and unified with the continuous beam. The execution of techniques of this kind is well known in optics.

Figure 8:
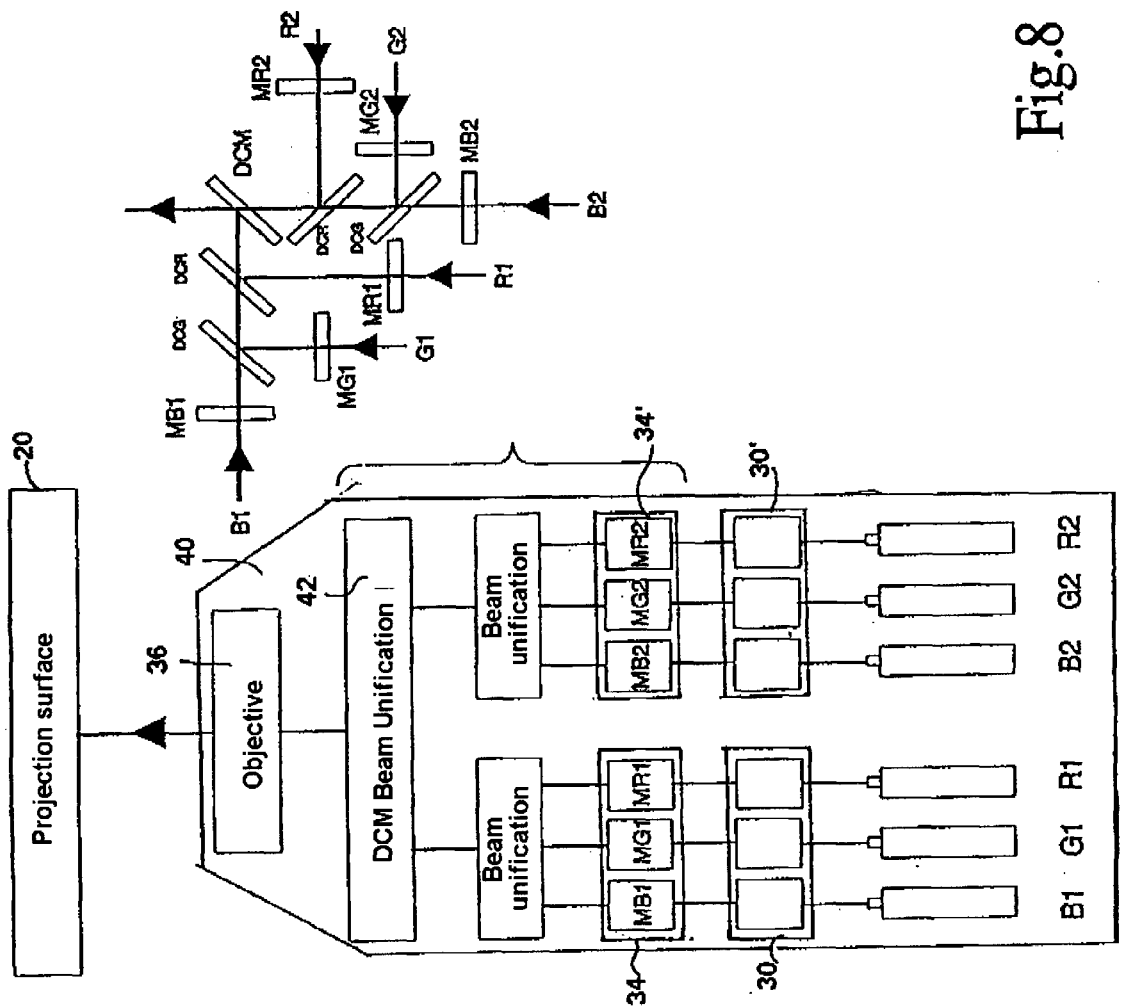
FIG. 8 shows another embodiment example for laser projection.

FIG. 8 shows a further embodiment example which is especially suitable for color video display by means of LCD matrices or tilting mirror arrays. The light of lasers $B_1$, $B_2$, $G_1$, $G_2$, $R_1$, $R_2$ is conducted through separate beam expanders and condensers 30, 30' and acted upon locally with different information though spatial modulators 34 and 34', for example, LCD matrices or tilting mirror arrays. The light bundles are only then combined by means of dichroic mirrors as is indicated again in particular to the right of the schematic view. The unified light bundle then travels through the common objective 36 onto the projection surface 20. The separation into different colored images is particularly suitable for LCD matrices and tilting mirror arrays because an especially high resolution is achieved in the current state of the art by this technique.

Figure 9:
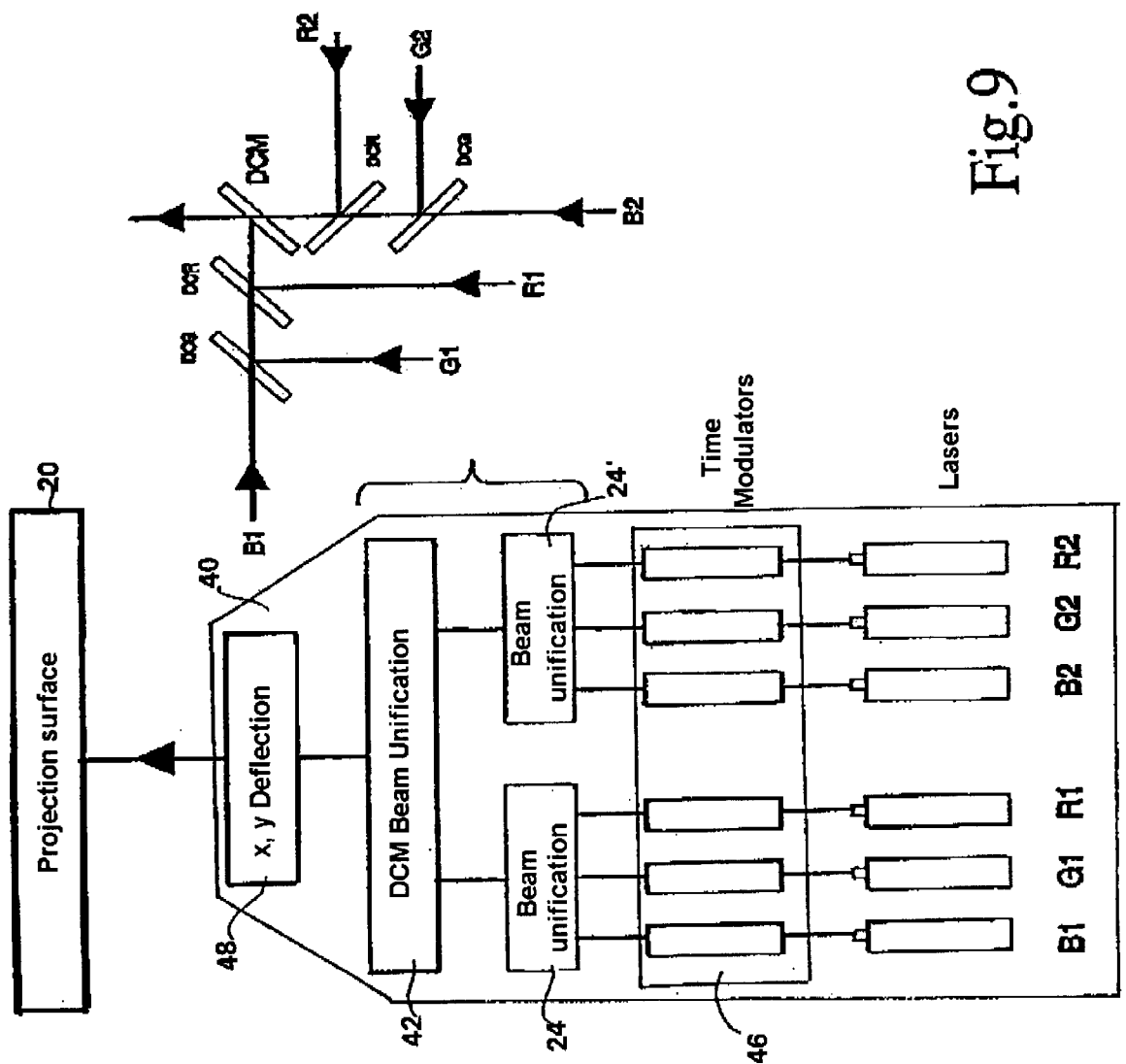
FIG. 9 shows an embodiment example for laser projection by raster scanning technique.

FIG. 9 shows an embodiment example which is especially advantageous, for example, for raster scanning technique, that is, when a light bundle which is rapidly scanned in two dimensions for sequential illumination of the individual image points of a video image. For this purpose, the light bundles emitted by the lasers $R_1$, $R_2$, $B_1$, $B_2$, $G_1$, $G_2$ are time-modulated through a set 46 of modulators. The temporal modulation is carried out synchronously with the controlling of the respective image point of the video image that is illuminated on the projection surface 20.

In this connection, as in the embodiment example in FIG. 8, six laser beams are unified by a beam combiner with dichroic mirrors 24, 24', 42 to form an individual focussed laser beam that is suitable for the illumination of individual image points and which is directed to an individual x-y deflection arrangement 48, for example, a polygon mirror and a swivel mirror, wherein the modulation by the set of modulators 46 is carried out so as to be synchronized with the respective location on the projection surface 20 that is illuminated by the scanned light bundle.

This embodiment form is particularly advantageous for laser technique with scanning light bundles because only one individual x-y deflection and possibly only one objective is required for expanding the image for both half-images.

The preceding embodiment examples show the many ways in which the invention can be applied in a very wide range of projection techniques. Naturally, many characteristics of the different embodiment examples can also be combined or other techniques known by those skilled in the art can also be used. For example, in an embodiment example in FIG. 9, dispersion prisms can also be used for beam unification. Further, it is also possible for integrated optics which are currently in development in some companies, universities and other institutions to be used for beam combination. Further, the x-y deflection device 48 can also be constructed, for example, with acousto-optic deflection devices.

It is also possible to use this process for increasing contrast in picture screens which are irradiated by electron beams by forming the picture screen with phosphors having narrow spectral widths.

While the foregoing description and drawings represent the present invention, it will be obvious to those skilled in the art that various changes may be made therein without departing from the true spirit and scope of the present invention.

What is claimed is:

1. A process for the projection of images on a screen by a light bundle, comprising:

providing an individual projector for projecting the images;

providing three monochromatic light sources in the projector for emitting light bundles of different colors used for projection, the light of each of the light bundles having a spectral peak in the visible wavelength range with a half-width of less than 100 nm;

observers of the image using eyeglasses which have a wavelength-dependent transmission function such that light in the wavelength range of the spectral peak of at least one of said light bundles passes through each eyeglass; and reducing, with use of said eyeglasses, the light intensity for light with wavelengths beyond the spectral peaks of the light bundles of different colors so as to filter out almost all spectral components of ambient light, especially sunlight, to increase the contrast of the image projection.

2. The process of claim 1, wherein said one spectral peak in the visible range has a half-width of less than 30 nm.

3. A system with an individual projector for displaying an image on a screen by a light bundle for carrying out a process, comprising:

a projector for projecting images;

at least three monochromatic light sources in the projector which emit light bundles of different colors and the light of each of the light bundles has a spectral peak in the visible wavelength range with a half-width of less than 100 nm;

eyeglasses with filters for which a wavelength-dependent transmission function is provided such that light in the wavelength range of at least one of said light bundles spectral peak passes through each eyeglass; and wherein the light intensity is reduced by said eyeglass filters for light with wavelengths beyond the spectral peaks of the light bundles of different colors so that large spectral components of ambient light, especially sunlight, are filtered out to increase the image contrast.

4. The system of claim 3, wherein said one spectral peak in the visible wavelength range has a half-width of less than 30 nm.

5. The system according to claim 3, said eyeglasses are arranged in a spectacle frame which is adapted to a head of an observer and wherein the spectacle frame is provided with a shield against light which prevents light from falling between the eyeglasses and eyes of the observer.

6. The system according to claim 3, wherein the light bundle has at least three spectral peaks and the eyeglass is transmitting for its wavelengths.

7. The system according to claim 6, wherein the light source emits light with spectral peaks of suitable intensity and centroid wavelengths so that it can be made physiologically detectable as the color white through the eyeglass.

8. The system according to claim 6, wherein a control device is provided for the display of a video image, by which the intensities of the spectral peaks in the light bundle are controllable independent from one another, and wherein the light source is configured for a position of the spectral peaks in the wavelength spectrum in which a light bundle whose light is physiologically detectable as white can be generated by this control.

9. The system according to claim 6, wherein the light source has at least three lasers for generating partial light bundles of different colors and has an optical system which unifies the light of the partial light bundles to form the common light bundle of the light source.

10. The system according to claim 3, wherein two eyeglasses arranged in a spectacle frame are provided, wherein the spectral transmission functions of the eyeglasses have different transmission ranges, and wherein the light bundle exiting from the projector has a spectrum which covers the transmission ranges of both eyeglasses, so that different image information for stereoscopic image display can be allocated to the two eyeglasses.

11. The system according to claim 10, for displaying stereoscopic video images, wherein the light bundle has a diameter suitable for imaging individual image points of the video image and a deflection device is provided which deflects the entire light bundle which is acted upon spectrally by the information for both eyes.

12. The system according to claim 2, wherein a dielectric coating system which determines the wavelength-dependent transmission function is provided on the eyeglass.

13. The system of claim 3, wherein said filters are dielectric interference filters.

14. The system of claim 3, wherein said filters are Fabry-Perot filters.

15. The system of claim 3, wherein said filters are metal-dielectric interference filters.

* * * * *